June 3, 1958

C. SABATER 2,837,168

TIME DELAYED SPEED GOVERNOR FOR VEHICLE

Filed Oct. 14, 1955

Carlos Sabater
INVENTOR.

June 3, 1958  C. SABATER  2,837,168
TIME DELAYED SPEED GOVERNOR FOR VEHICLE
Filed Oct. 14, 1955  3 Sheets-Sheet 2

Carlos Sabater
INVENTOR.

June 3, 1958  C. SABATER  2,837,168
TIME DELAYED SPEED GOVERNOR FOR VEHICLE
Filed Oct. 14, 1955  3 Sheets-Sheet 3

Carlos Sabater
INVENTOR.

BY Clarence A. O'Brien
and Harvey B. Jacobson
Attorneys

United States Patent Office 2,837,168
Patented June 3, 1958

2,837,168

TIME DELAYED SPEED GOVERNOR FOR VEHICLE

Carlos Sabater, Ponce, Puerto Rico

Application October 14, 1955, Serial No. 540,417

3 Claims. (Cl. 180—82.1)

This invention relates generally to a vehicle speed governing control system and is more particularly concerned with a speed control system attachment for retaining the speed of a vehicle below a predetermined velocity wherein the novel system is responsive to indicated velocity of a vehicle and which permits a predetermined interval of uncontrolled velocity of the vehicle prior to the imposition of control of the speed above a predetermined value.

Speed governing or control systems have generally utilized carburetor or magneto controls which cut out or impede operation of a vehicle engine to maintain the speed of the vehicle below a predetermined value. Most of the heretofore known governing or control systems are dependent upon engine velocity or revolutions per minute rather than the indicated speed of the vehicle, and generally the heretofore known systems do not incorporate therein means for permitting full power of the vehicle engine to be available during emergency conditions.

One of the primary objects of invention in conformance with that set forth above is to utilize a vehicular governing control system based upon indicated velocity of the vehicle and including means for providing an ungoverned increment of power for emergency power demand conditions prior to the control of the velocity of the vehicle above a predetermined speed.

A more specific object of invention in conformance with that set forth is to provide a master control assembly operable by a speedometer cable and including adjustable electrical contact means for activating an electrical circuit controlling a timer control assembly which permits an increment of unlimited power available for driving the engine of the vehicle and subsequent cutting out of the engine of the vehicle above a predetermined velocity thereof.

Another object of invention in conformance with that set forth above is to provide a vehicle control system of the character set forth which includes signal means operatively connected to the master control and timer assemblies for apprising the operator of the vehicle as to when said assemblies are in operation.

A still further object of invention in conformance with that set forth above is to provide a vehicle control system which is readily and economically manufactured, easily installed and used, highly efficient and safe in use, and readily acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7 is a wiring diagram of the vehicle control system.

Figure 1:
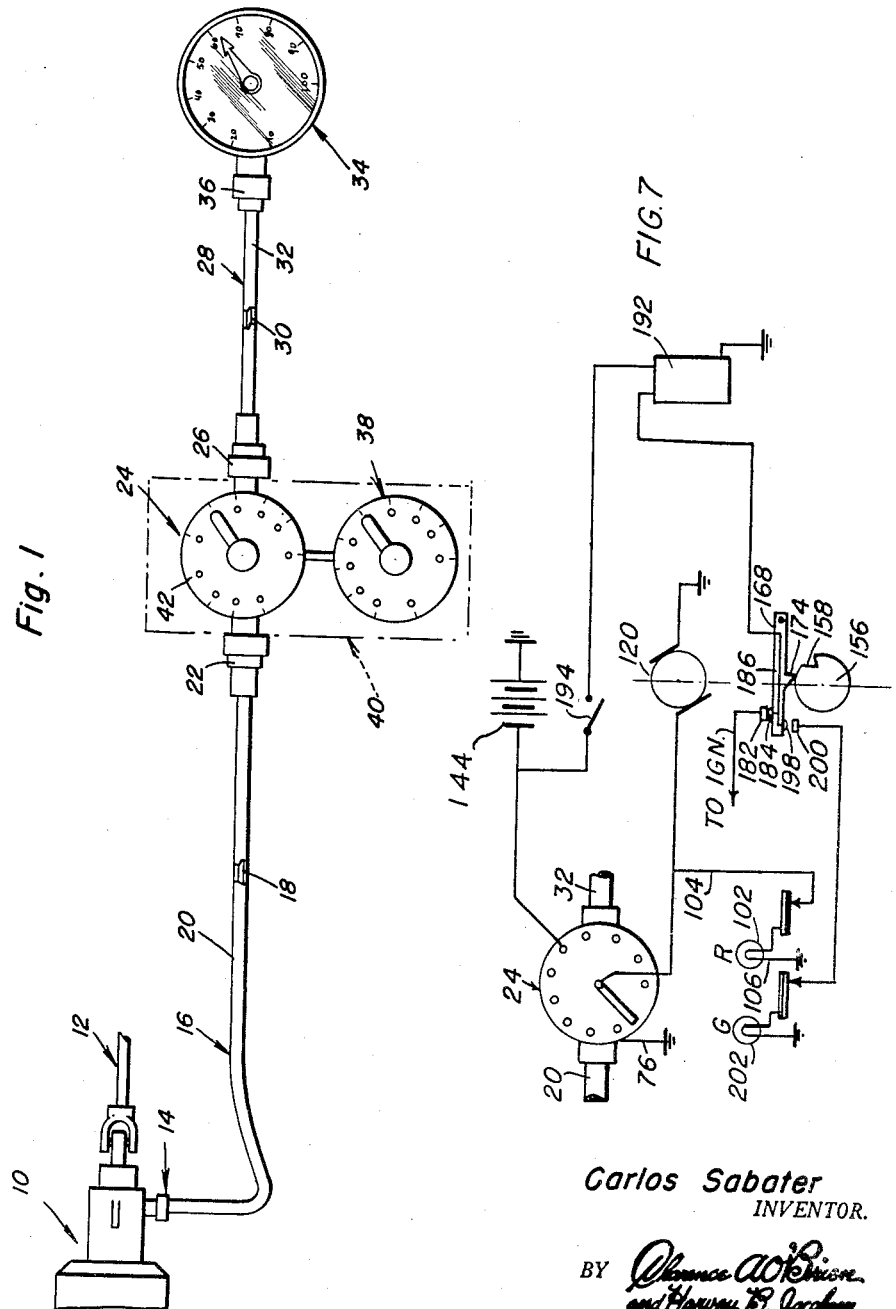
Figure 1 is a diagrammatic view of the novel vehicle control system.

Indicated generally at 10 is a vehicle transmission which includes the usual drive shaft 12 on which is operatively secured thereto by means of a conventional connection 14 a conventional speedometer cable drive shaft 16 including the usual internal flexible drive shaft 18 of any convenient cross sectional configuration enclosed in the conventional housing 14. The speedometer drive cable 16 is connected by means of a suitable connecting nut 22 to a master control assembly indicated generally at 24, said master control assembly being connected in series by means of a suitable connecting nut 26 to a second speedometer drive cable 28 including the usual flexible drive shaft 30 and housing 32 which is connected to a conventional speedometer 34 by means of a suitable connecting nut 36. The master control assembly is operatively connected to a timer control assembly indicated generally at 38, and these assemblies, the master control and timer assemblies, may be enclosed in a suitable container indicated generally at 40 which may have entrance thereto controlled by a suitable lock, this assembly being located in a convenient position on the vehicle for the purpose of adjustment as well as locking the same after the governor control has been adjusted.

As will subsequently become apparent, the master control assembly is substantially identical to the speedometer 34 and is adjusted to provide engagement of a pair of electrical contacts and a predetermined indicated speed of the vehicle whereupon the timer control 38 will be activated and for a given increment of time the operator of the vehicle will be afforded unlimited power for the vehicle, and after the passage of such time velocity of the vehicle will be controlled by cutting out operation of the engine of the vehicle until the velocity of such vehicle reaches a value below the maximum for which the master control has been previously adjusted.

Figure 2:
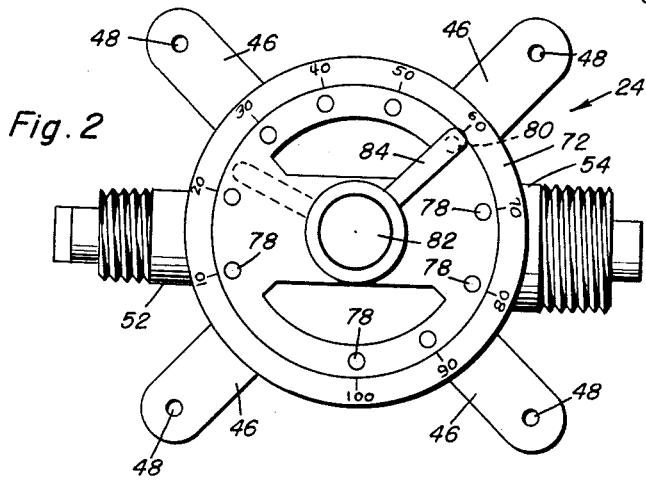
Figure 2 is an enlarged front elevational view of the master regulator assembly.
Figure 3:
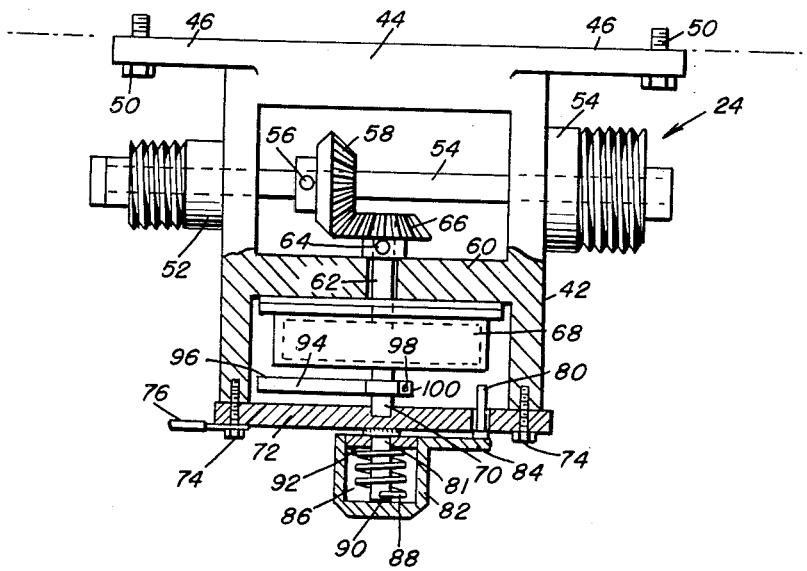
Figure 3 is a top plan view of the master control assembly of Figure 2 with portions broken away and in section for clarity.

As most clearly seen in Figures 2 and 3, the master control assembly 24 includes a suitable cylindrical housing 42 having a back portion 44 including integral laterally extending securing legs 46 suitably apertured at 48 for receiving therein suitable fasteners 50 for connection to a convenient support of any suitable character. The housing 42 includes a pair of oppositely disposed coaxial tubular elements 52 and 54 which are respectively connectable to the connecting nuts 22 and 26, respectively, of the speedometer drive cables 16 and 28, respectively, the drive cable portions 18 and 30, per se, thereof being operatively connected to a suitable drive shaft 54 rotatably supported in the housing 42 and having secured thereon in any suitable manner, by means of the set screw 56, for example, a bevel drive gear 58. The housing 42 includes an intermediate partition portion 60 rotatably supporting a driven shaft 62 therein which has on one end secured by means of a suitable set screw 64, for example, a driven bevel gear 66 at right angles to the gear 58 and driven thereby, said shaft 62 carrying on its opposite end a suitable magnetic coupling 68, of the character generally found in speedometers, said magnetic coupling having extending therefrom a shaft 70 which is suitably journalled in a removable cover plate 72 which is calibrated, for example, in ten mile per hour increments, just as is the speedometer 34, see Figure 2, the cover plate being secured on the housing 42 by means of suitable fastening screws 74.

The master control housing 42 may have secured to one of the screw elements 74 a suitable electrical wire 76 for grounding the housing to the chassis of the vehicle as is conventional in single line electrical systems for automotive vehicles, and the calibrated cover 72 of the master control assembly includes a plurality of circumferentially disposed apertures 78 which correspond to the calibrations thereon and which removably receive an electrical control element 80 therethrough. As most clearly seen in Figure 3, a small shaft 81 is secured on the cover 72 in co-axial relation to the shaft 70. The shaft 81 has rotatably and slidably journaled thereon an adjusting knob 82 having a radially extending contact arm 84 engageable with the contact 80, thus by rotation of the knob 82 with the arm 84 in contact with the previously positioned contact 80, the master control assembly will be set at a predetermined control speed, 60 miles per hour, for example as shown in Figures 2 and 3. Contained within the hollow interior 86 of the knob 82 is a coil spring 88 having one end 90 secured to the shaft 81 and the other end of which being loose on the shoulder 92 of the hollow interior of the knob 82. Fixedly secured on the shaft 70 in any suitable manner is a contact arm 94 of a suitable non-conducting material and including an electrical contact end portion 96 engageable with the adjustable contact 80, thus rotation of the magnetic coupling 68 of the master control assembly results in rotation of the contact arm 94 into contact with the adjustable contact 80 when a speed of 60 miles per hour is reached, closing an electrical circuit for activating the timer control assembly 38. When the speed of the vehicle is reduced below 60 miles per hour, the magnetic coupling 68 of the master control assembly will be rotated counterclockwise and arm 94 with contact 96 is urged out of contact or rotates counterclockwise away from the adjustable contact 80 thus deactivating the timer control assembly 38. The contact arm 94 may include on an end portion thereof a suitable connecting or contact screw element 98 to which a suitable electrical conductor 100 may be connected.

As seen in Figure 7, a suitable flasher-type signal assembly 102 which may be a red signal light, or audio signal is connected in parallel with the master control assembly 24 by means of suitable electrical conductors 104 and 106, and when the contact arm 94 comes in contact with the contact 80 the signal 102 is activated to apprise the user of the vehicle that the timer control assembly has been activated and that he has available a predetermined increment of unlimited power for emergency conditions before the velocity of the vehicle is subject to the governor control system.

Figure 4:
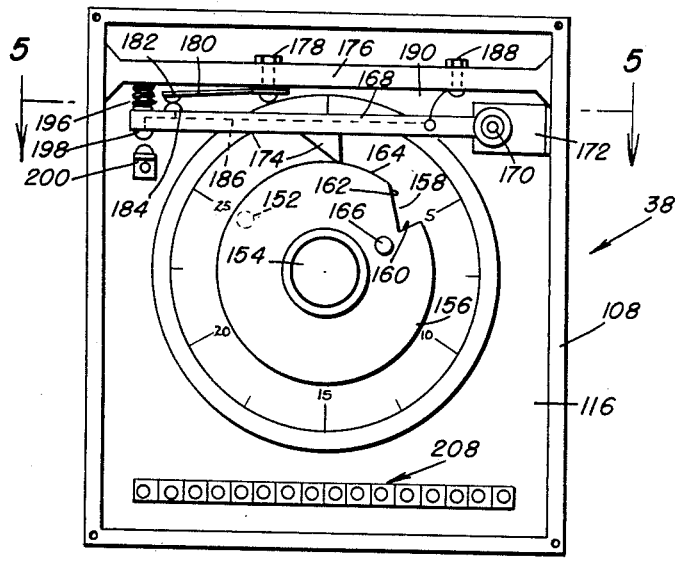
Figure 4 is a front elevational view of the timer control assembly.
Figure 5:
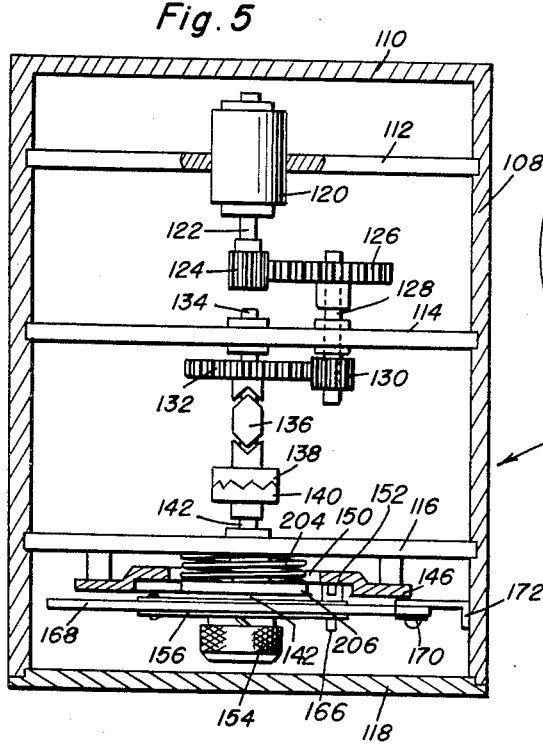
Figure 5 is a sectional view taken substantially on line 5—5 of Figure 4.
Figure 6:
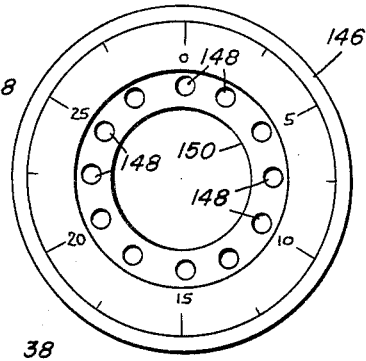
Figure 6 is a front elevational view of the timer dial of the timer control assembly of Figure 5.

As most clearly seen in Figures 4, 5 and 6 the timer control assembly 38 includes a suitable housing member 108 having a back member 110, intermediate partitions 112, 114, 116 and a removable cover plate 118 of any convenient character. The partition member 112 suitably supports a conventional direct current motor 120 which is wired to be accommodated in a conventional vehicle ignition system, said motor including a drive shaft 122 having an integral drive pinion gear 124 drivingly engaged with a drive gear 126 carried on a shaft 128 suitably journaled in the support partition 114. The drive shaft 128 extends through the partition 114 and has integrally secured thereon a drive pinion gear 130 engaged with a driven gear 132 carried on a drive shaft 134 rotatably supported in spaced relationship from the shaft 128 on the partition 114, said shaft 134 incorporating therein an intermediate connecting clutch assembly 136 of any suitable character which incorporates a slip clutch assembly comprised of cooperating parts 138 and 140, the portion 140 being integrally connected to a shaft element 142 suitably supported for rotation in the partition 116. The motor 120, seen in Figure 7, is suitably connected to the conductor 100 and to a source of potential 144, such as the battery of the electrical system of the vehicle, and accordingly upon the contact of the conducting arm 94 and the contact 80 the motor 120 will be activated. The gears 124, 126, 130 and 132 are so proportioned to obtain a desired rotation of the shaft 142 relative to a given increment of time, for example, the shaft 142 may make one complete revolution in 30 seconds.

Suitably secured on the partition 116 is an annular calibrated collar 146 which is calibrated in 2½ second increments, for example, having a plurality of apertures 148 extending circumferentially therearound which correspond to said calibrations, see Figures 4 and 6, the collar 146 including a central aperture 150 for a purpose to be subsequently described. A stop pin 152, see Figure 5, is removably received in any desired aperture 148 depending upon the interval or increment of full power to be permitted in the vehicle engine being controlled, the pin 152 being positioned in the 25 second increment, for example, as seen in Figure 4. The shaft 142 extends coaxially through the central aperture 150 of the plate 146 and has clampingly secured thereon by means of knurled nut element 154 a cam disk element 156 which includes a peripheral notch or groove portion 158 having a radial side 160 connected to an angular side portion 162 extending into the outer or cam edge 164 of said cam disk. The cam disk has extending therethrough a stop pin element 166 which is engageable with the stop or abutment pin 152 extending through the plate 146, and accordingly the disk 156 may be freely rotated into contact with the pin 152 until said stop pin 166 is in engagement therewith by loosening the knurled nut 154. Thus the cam disk 156 will have been rotated through an arcuate path when rotated by the motor 120 and the previously mentioned gears defining a drive assembly associated therewith will define a given time interval when the cam disk portion 160 attains the position indicated by "zero" on the plate 146 as seen in Figure 6.

A pivoted lever member 168 is pivoted by means of a suitable pivot element 170 on a suitable bracket element 172 suitably secured on the housing member 108, the lever being in overlying relationship relative to the edge 164 of the cam disk 156, said lever element 168 including a cam follower portion 174 conforming to the cutout or notched out portion 158 of said cam disk. As seen in Figure 4, a transverse contact support element 176 extends in overlying relationship to the lever 168 and bracket 172, and has suitably supported from an intermediate portion thereof a contact element 178 including a spring connector plate 180 having an end contact portion 182 engageable with the contact 184 carried on the lever 168. The lever 168 is constructed of a suitable non-conducting material such as Bakelite, and includes an interior embedded lead or conductor portion 186 therein which is connected to the contact 184. As seen in Figure 4, the contacts 182 and 184 together with a suitable contact element 188 connected by means of a suitable conductor line 190 define a general constant source of potential to a conventional spark coil 192 from the source of potential 144 when a conventional control switch 194 has been activated.

A suitable compression spring element 196 is interposed between the lever 168 and the contact support element 176 and accordingly urges the cam follower portion 174 into the peripheral notch portion 158 of the cam disk when said cutout peripheral portion is in underlying relationship relative to the cam follower. When this occurs, the contacts 182 and 184 of members 168 and 176, respectively, are urged out of engagement and a lower contact 198 on a lower portion of the lever 168 and a contact element 200 are engaged with each other, current being cut off from the spark coil 192, the aforementioned engagement of the contacts 198 and 200 resulting in the activation of a signal flasher indicated generally at 202, see Figure 7, which may be a flashing green light, and accordingly the operator of the vehicle is apprised of the fact that current is no longer available at the spark coil and accordingly the engine for the vehicle is cut out.

As seen in Figure 5, a coil spring 204 has one end suitably secured to the partition 116, the other end of said coil spring being connected to the shaft 142 by means of a suitable washer element 206, thus when the shaft 142 is rotated by means of the gears 124, 126, 130 and 132 due to activation of the motor 120, the coil spring 204 will be wound up and upon the motor 120 ceasing to operate, the spring 204 will urge the abutment or stop pin 166 into the previously mentioned engagement with the abutment pin 152 thus the timer control assembly will be ready or be positioned automatically for subsequent operation. During those periods of time when the vehicle is operating above the predetermined speed set on the master control assembly, the motor 120 continues to operate, and damage is prevented to said motor and other cooperating parts by virtue of the slip engagement between the clutch elements 138 and 140.

Although the device has been described as being usable in connection with the cutting out of the spark coil of an internal combustion engine, it is to be understood that this governor control may be likewise utilized with an electrical current operated solenoid for actuating other accessories for controlling an internal combustion engine, for example, for cutting off the flow of fluid from a fuel supply pump (not shown).

The casing 108 of the timer control assembly may incorporate therein a conventional group of wiring contacts indicated as a bank of contacts at 208.

Considering the wiring diagram of Figure 7, actuation of the switch 194 provides current from the source of potential 144 to the spark coil 192 (or any other control assembly). On the vehicle exceeding the predetermined speed set in the master control assembly, the conductor arm 94 and contact element 80 coming in contact activate the flasher 102 and also the motor 120. Rotation of the motor 120 results in rotation of the cam disk 156 until the contacts 182 and 184 are disengaged whereupon the contacts 198 and 200 are engaged resulting in cutting off the current flow to the member 192 and activating the signal flasher 202. When the speed of the controlled vehicle diminishes below the predetermined value, current will no longer flow in the motor 120 inasmuch as the conducting arm 94 and contact element 80 will no longer be in contact, and accordingly the spring 204 will urge the cam disk element 156 back to the position shown in Figure 5, the cam follower element 174 readily moving off of the angular cutout side portion 162 of the peripheral notch portion 158 of the cam disk element.

Various positional directional terms such as "front," "rear," etc. are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use with a motor vehicle that has a part which rotates at a speed proportional to the speed of the vehicle, a speed responsive control assembly to open the ignition circuit thereof upon overspeed for a predetermined period of time, said assembly comprising a housing, a first contact, means connected to said first contact for moving said contact a distance which is proportional to the speed of said part, a second contact, means mounting said second contact on said housing in selected positions with respect to the travel of said first contact, a timer control comprising a casing, a motor in said casing, an electric circuit arranged to energize said motor when said first and second contacts are closed, a shaft, means including an over-riding clutch drivingly connecting said shaft to said motor, a cam secured to said shaft and rotatable therewith, a stationary contact, a lever pivoted to said casing, a movable contact carried by said lever and normally touching said stationary contact, said movable and stationary contacts constituting a part of a switch that has terminals adapted to be connected operatively in the vehicle ignition circuit, a cam follower on said lever and riding on said cam, a spring tending to open said switch and keep said follower on said cam, adjustable means to limit the extent of travel of said cam, and a spring connected with said cam to return said cam to the starting position and thereby move said lever to such position that said switch is closed.

2. For use with a motor vehicle that has a part which rotates at a speed proportional to the speed of the vehicle, a speed responsive control assembly to open the ignition circuit thereof upon overspeed for a predetermined period of time, said assembly comprising a housing, a first contact, means connected to said first contact for moving said contact a distance which is proportional to the speed of said part, a second contact, means mounting said second contact on said housing in selected positions with respect to the travel of said first contact, a timer control comprising a casing, a motor in said casing, an electric circuit arranged to energize said motor when said first and second contacts are closed, a shaft, means including an over-riding clutch drivingly connecting said shaft to said motor, a cam secured to said shaft and rotatable therewith, a stationary contact, a lever pivoted to said casing, a movable contact carried by said lever and normally touching said stationary contact, said movable and stationary contacts constituting a part of a switch that has terminals adapted to be connected operatively in the vehicle ignition circuit, a cam follower on said lever and riding on said cam, a spring tending to open said switch and keep said follower on said cam, adjustable means to limit the extent of travel of said cam, a spring connected with said cam to return said cam to the starting position and thereby move said lever to such position that said switch is closed, said adjustable means including an abutment, means mounting said abutment in selected places in said casing, and a pin carried by said cam and adapted to contact said abutment.

3. The assembly of claim 1 wherein there are electrically operative signal devices which are energized in response to the touching of said first and second contacts and the opening of said switch, respectively.

References Cited in the file of this patent

UNITED STATES PATENTS

| | | |
|---|---|---|
| 1,936,993 | Reed | Nov. 28, 1933 |
| 2,169,268 | McCullough | Aug. 15, 1939 |
| 2,410,998 | Reavis | Nov. 12, 1946 |
| 2,521,301 | Morrison | Sept. 5, 1950 |
| 2,536,133 | Klammer et al. | Jan. 2, 1951 |
| 2,580,080 | Dewhirst | Dec. 25, 1951 |
| 2,649,908 | Morse et al. | Aug. 25, 1953 |
| 2,678,095 | Chapman | May 11, 1954 |